United States Patent
Obaidi

(10) Patent No.: US 9,426,661 B2
(45) Date of Patent: Aug. 23, 2016

(54) SECURE LOCK FOR MOBILE DEVICE

(71) Applicant: T-Mobile USA, Inc., Bellevue, WA (US)

(72) Inventor: Ahmad Arash Obaidi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/874,023

(22) Filed: Oct. 2, 2015

(65) Prior Publication Data

US 2016/0029220 A1 Jan. 28, 2016

Related U.S. Application Data

(62) Division of application No. 13/842,116, filed on Mar. 15, 2013, now Pat. No. 9,172,538.

(60) Provisional application No. 61/636,499, filed on Apr. 20, 2012, provisional application No. 61/645,546, filed on May 10, 2012, provisional application No. 61/684,683, filed on Aug. 17, 2012.

(51) Int. Cl.
  H04W 12/08 (2009.01)
  H04L 9/28 (2006.01)
  (Continued)

(52) U.S. Cl.
  CPC .......... *H04W 12/08* (2013.01); *G06F 9/4406* (2013.01); *G06F 21/31* (2013.01); *G06F 21/44* (2013.01); *G06F 21/51* (2013.01); *G06F 21/575* (2013.01); *G06F 21/88* (2013.01); *H04L 9/28* (2013.01); *H04W 12/06* (2013.01); *H04W 12/12* (2013.01);
  (Continued)

(58) Field of Classification Search
  CPC combination set(s) only.
  See application file for complete search history.

(56) References Cited

U.S. PATENT DOCUMENTS 6,226,749 B1   5/2001   Carloganu et al.
6,317,836 B1   11/2001  Goren et al.
(Continued)

FOREIGN PATENT DOCUMENTS

CN   101398872 A   4/2009
EP   1359733 A1    11/2003
(Continued)

OTHER PUBLICATIONS

Lee, et al., "A New Delegation-Based Authentication Protocol for Use in Portable Communication Systems", IEEE Transactions on Wireless Communications, vol. 4, No. 1, Jan. 2005, pp. 57-64.
(Continued)

*Primary Examiner* — Beemnet Dada
(74) *Attorney, Agent, or Firm* — Lee & Hayes, PLLC

(57) ABSTRACT

A secure lock procedure for mobile devices is disclosed. The secure lock process generally includes detecting a device access attempt at a telecommunication device during a security-enabled boot sequence. The device access attempt may include a cryptographic key, which when detected, initiates a cryptographic authentication operation. The cryptographic authentication operation results in access to one or more resource of the telecommunication device being enabled, when the cryptographic key is determined to be valid, or denied, when the cryptographic key is determined to be invalid. The device access attempt may be associated with a root-level device access attempt or software flash attempt, and the secure lock procedure can be implemented in conjunction with a boot loader stored within a memory of the telecommunication device.

16 Claims, 9 Drawing Sheets

(51) Int. Cl.

| | |
|---|---|
| *H04W 12/06* | (2009.01) |
| *H04W 12/12* | (2009.01) |
| *G06F 21/57* | (2013.01) |
| *G06F 21/44* | (2013.01) |
| *G06F 9/44* | (2006.01) |
| *G06F 21/31* | (2013.01) |
| *G06F 21/51* | (2013.01) |
| *G06F 21/88* | (2013.01) |
| *H04L 29/06* | (2006.01) |

(52) U.S. Cl.
CPC ........... *H04L 63/0823* (2013.01); *H04L 63/102* (2013.01)

(56) References Cited

U.S. PATENT DOCUMENTS

| | | | |
|---|---|---|---|
| 6,321,079 | B1 | 11/2001 | Cooper |
| 6,327,660 | B1 | 12/2001 | Patel |
| 7,689,204 | B2 | 3/2010 | Dupuis et al. |
| 2005/0172135 | A1 | 8/2005 | Wiersma |
| 2006/0075259 | A1 | 4/2006 | Bajikar et al. |
| 2007/0154014 | A1 | 7/2007 | Aissi et al. |
| 2007/0180269 | A1 | 8/2007 | Irish et al. |
| 2007/0264990 | A1 | 11/2007 | Droste et al. |
| 2008/0090614 | A1 | 4/2008 | Sicher et al. |
| 2008/0132226 | A1 | 6/2008 | Carnall |
| 2008/0209206 | A1 | 8/2008 | Vaha-Sipila et al. |
| 2008/0229092 | A1 | 9/2008 | Dale et al. |
| 2008/0282084 | A1 | 11/2008 | Hatakeyama |
| 2008/0307494 | A1 | 12/2008 | Holtzman et al. |
| 2009/0083858 | A1 | 3/2009 | Jennings et al. |
| 2009/0158419 | A1 | 6/2009 | Boyce |
| 2009/0165119 | A1 | 6/2009 | Ramanath |
| 2009/0270126 | A1 | 10/2009 | Liu |
| 2009/0325646 | A1 | 12/2009 | Stewart et al. |
| 2010/0082968 | A1 | 4/2010 | Beverly |
| 2010/0263043 | A1* | 10/2010 | Xu .......................... G06F 11/26 726/17 |
| 2010/0273452 | A1 | 10/2010 | Rajann et al. |
| 2010/0299744 | A1 | 11/2010 | Mardiks |
| 2011/0076986 | A1 | 3/2011 | Glendinning et al. |
| 2011/0081889 | A1 | 4/2011 | Gao et al. |
| 2011/0130117 | A1 | 6/2011 | Fan et al. |
| 2011/0130118 | A1 | 6/2011 | Fan et al. |
| 2011/0159843 | A1 | 6/2011 | Heath et al. |
| 2011/0307711 | A1 | 12/2011 | Novak et al. |
| 2012/0042376 | A1 | 2/2012 | Dolgunov et al. |
| 2012/0058743 | A1 | 3/2012 | Chen |
| 2012/0083242 | A1 | 4/2012 | Spitz et al. |
| 2012/0101941 | A1 | 4/2012 | Kang et al. |
| 2013/0304616 | A1 | 11/2013 | Raleigh et al. |
| 2014/0057597 | A1 | 2/2014 | Velusamy et al. |

FOREIGN PATENT DOCUMENTS

| | | |
|---|---|---|
| EP | 2063378 A2 | 5/2009 |
| WO | WO2004063871 A2 | 7/2004 |
| WO | WO2008077628 A2 | 7/2008 |
| WO | WO2013158977 A1 | 10/2013 |

OTHER PUBLICATIONS

The Extended European Search Report mailed May 20, 2015 for European Patent Application No. 12843678.9, 8 pages.
Final Office Action for U.S. Appl. No. 13/660,350, mailed on Jan. 13, 2014, Ahmad Arash Obaidi, "Mobile Device-Type Locking", 8 pages.
Office Action for U.S. Appl. No. 13/796,550, mailed on Jan. 26, 2015, Senthil Kumar Mulluppadi Velusamy, "SIM Level Mobile Security", 18 pages.
Office Action for U.S. Appl. No. 13/842,116, mailed on Jan. 27, 2015, Ahmad Arash Obaidi, "Secure Lock for Mobile Device", 7 pages.
Final Office Action for U.S. Appl. No. 13/840,045, mailed on Nov. 17, 2014, Adrian Buzescu, "Remote Unlocking of Telecommunication Device Functionality", 12 pages.
Office Action for U.S. Appl. No. 13/839,189, mailed on Feb. 24, 2015, Alexandru Catalin Ionescu, "Secure Environment for Subscriber Device", 8 pages.
Final Office Action for U.S. Appl. No. 13/796,550, mailed on May 13, 2015, Senthil Kumar Mulluppadi Velusamy, "SIM Level Mobile Security", 18 pages.
Office Action for U.S. Appl. No. 13/660,350, mailed on Jul. 22, 2013, Obaidi, "Mobile Device-Type Locking", 8 pages.
Office action for U.S. Appl. No. 13/840,045, mailed on Jul. 29, 2015, Buzescu et al., "Remote Unlocking of Telecommunication Device Functionality", 10 pages.
Office action for U.S. Appl. No. 13/840,045, mailed on Jul. 30, 2014, Buzescu et al., "Remote Unlocking of Telecommunication Device Functionality", 11 pages.
Office action for U.S. Appl. No. 13/839,189, mailed on Aug. 21, 2015, Ionescu et al., "Secure Environment for Subscriber Device", 7 pages.
Office action for U.S. Appl. No. 13/660,350, mailed on Aug. 7, 2014, Froelich et al., "Mobile Device-Type Locking", 8 pages.
The PCT Search Report and Written Opinion mailed Jan. 17, 2013 for PCT Application No. PCT/US12/62050, 10 pages.
The PCT Search Report and Written Opinion mailed Jul. 1, 2013 for PCT Application No. PCT/US13/37345, 10 pages.
The PCT Search Report and Written Opinion mailed Jul. 30, 2013 for PCT Application No. PCT/US13/37332, 13 pages.
The PCT Search Report and Written Opinion mailed Sep. 17, 2013 for PCT Application No. PCT/US13137381, 11 pages.
The Chinese Office Action mailed Feb. 26, 2016 for Chinese patent application No. 201280053062.8, a counterpart foreign application of U.S. Pat. No. 9,055,443.
The Extended European Search Report mailed Nov. 11, 2015 for European patent application No. 1377892238, 6 pages.
The Extended European Search Report mailed Nov. 27, 2015 for European patent application No. 13778691.9, 9 pages.
Office action for U.S. Appl. No. 13/796,550, mailed on Jan. 11, 2016, Velusamy et al., "SIM Level Mobile Security", 20 pages.
Office action for U.S. Appl. No. 13/839,189, mailed on Dec. 23, 2015, Ionescu et al., "Secure Environment for Subscriber Device", 14 pages.
Final Office Action for U.S. Appl. No. 13/796,550, mailed on May 23, 2016, Senthil Kumar Mulluppadi Velusamy, "SIM Level Mobile Security", 22 pages.

* cited by examiner

500

SECURE LOCK FOR MOBILE DEVICE

CROSS REFERENCE TO RELATED PATENT APPLICATIONS

This is a divisional application which claims priority to U.S. Utility patent application with Ser. No. 13/842,116, filed Mar. 15, 2013, which claims priority from U.S. Provisional Patent Application Nos. 61/636,499, filed Apr. 20, 2012, 61/645,546, filed May 10, 2012, and 61/684,683, filed Aug. 17, 2012. Application Ser. Nos. 13/842,116, 61/636,499, 61/645,546 and 61/684,683 are all hereby incorporated by reference herein, in their entirety.

BACKGROUND

Modern telecommunication service providers sell propriety wireless communication devices and services to their customers under the good-faith assumption that these resources will be utilized as intended. For example, a service provider may allow access to its telecommunication service by selling its customers prepaid or postpaid (subscription-based) rate plans, which are associated with device-specific service level agreements. A service provider may also require its customers to purchase proprietary communication devices, including: cellular phones, personal digital assistants, tablet computers, and the like, in order to access its wireless services.

Further, telecommunication service providers and mobile device manufacturers enter into cooperative business agreements that can contractually bind select manufacturers' products to a particular service provider. In practice, these agreements are based on many important real-world considerations, including a service provider's customer-base, existing market share, and forecast device sales, amongst many other notable factors and considerations. However, these mutually beneficial business relationships can be negatively impacted by customer deviations from both expected service usage and retail device purchases. Accordingly, it is important for service providers and affiliated device manufactures to collaborate with each other, to ensure that both contracting parties are able to achieve their independent and collective business objectives, even with the advent of consumer resource usage anomalies.

Adding to the problem of unanticipated customer deviations, many tech-savvy consumers have contrived ways to gain unauthorized access to locked communications devices, thereby frustrating the business and marketing objectives of both telecommunication service providers and device manufacturers. This subset of consumers has been able to successfully bypass security measures employed in proprietary communication devices of an affiliated service provider. For instance, some mobile device users execute unauthorized software routines to breach certain security features of their device and gain root-level access to their device's operating system (OS). Achieving this OS-level access can allow a user to download additional applications, extensions, and themes that are not approved by the device's authorized service provider and/or media content provider(s). This misuse of a carrier-locked communication device is sometimes referred to in the industry as "jail-breaking" a device.

Another example of a common hardware hack that has been employed by some telecommunication device users is to purchase an after-market product known as a "SIM-shim," which is a thin circuit board that is designed to fit between a service provider's Subscriber Identity Module (SIM) card and a telecommunication device's SIM socket. The SIM-shim device can be employed to allow a user to unlock his or her carrier-locked device, by simply inserting this add-on component into his or her device, thereby effectuating an override of device security features intended to keep the device restricted to services of a specific telecommunication service provider.

One particularly susceptible root-level process that is routinely executed by telecommunication devices is a device boot sequence, which activates/initializes the device's hardware and software resources. Generally, at a time when a computing device is either powered on, restarted, or reset, a corresponding device-specific boot loader component will proceed through a sequential set of basis input/output (BIOS) compliant operations to test and boot device hardware. Then, the boot loader initializes the device's operating system (OS) kernel, such as the Linux® kernel, which is employed in conjunction with the Google Android® Mobile Device OS, to bridge the device's hardware to one or more software applications stored in device memory. Thereafter, the boot loader initializes the device OS, along with various software applications. These device booting activities may occur prior to user-controlled device runtime activity.

Unfortunately, some device users have been able to gain unauthorized access to proprietary device resources during sensitive boot sequence operations, before the device has been able to activate important device security features. In this manner, vulnerable layers in a device boot stack have been targeted and exploited by tech-savvy consumers whose intent is to circumvent various known security mechanisms employed by telecommunication service providers within their proprietary communication devices. Unauthorized device access is often achieved through one or more root-level device access attempts that occur during a device's boot sequence; however, they can also occur during device runtime events.

BRIEF DESCRIPTION OF THE DRAWINGS

The Detailed Description is set forth with reference to the accompanying figures.

DETAILED DESCRIPTION

This disclosure describes a device security measure that can be employed within wireless communication devices, such as provider-issued cellular telephones, smart phones, tablets, portable computers, and the like, to prevent unauthorized users from gaining access to proprietary telecommunication device resources. Further, the security measures described herein are configured to prevent mobile device users from circumventing or otherwise defeating known telecommunication device security safeguards with one or more device software and/or hardware hacks.

Figure 1:
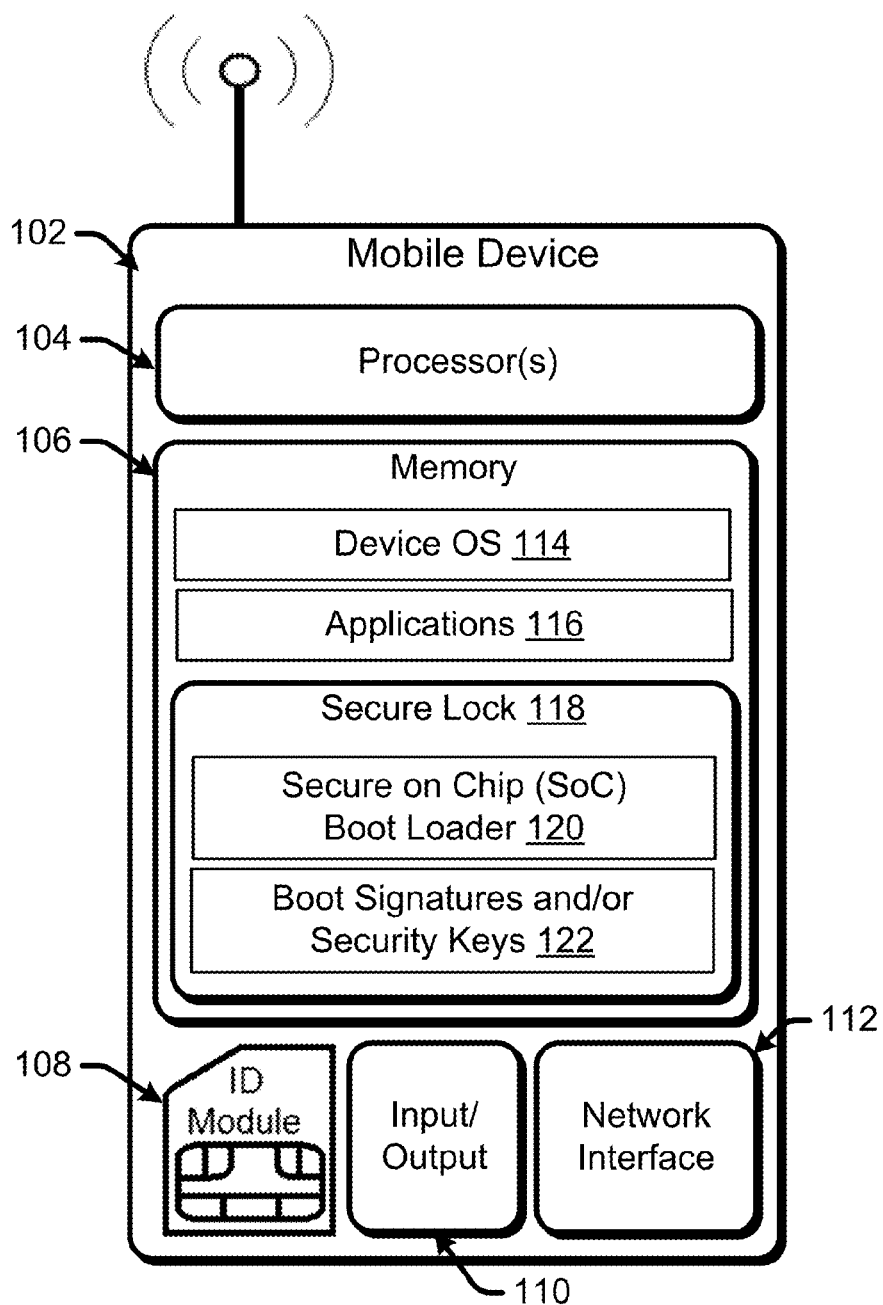
FIG. 1 depicts a hardware platform of a telecommunication device having a Secure Lock component stored in memory, in accordance with embodiments of the disclosure.

FIG. 1 depicts a hardware platform 100 including a mobile device 102 with a Secure Lock component 118 that is configured to implement select device security operations, in accordance with various embodiments of the disclosure. The mobile device 102 can be representative of any type of modern wireless communication device, including, but not limited to: a cellular phone or smart phone, a tablet computer, an electronic book device, a handheld gaming unit, or a personal media player. In various implementations, the mobile device 102 might be configured to communicate within a 2G, 3G, or 4G, telecommunication network, using any common wireless access technology, including, but not limited to: Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, or WiFi® technology. Further, the mobile device 102 may be configured to run any common mobile device operating system, including, but not limited to: Microsoft Windows Mobile®, Google Android®, Apple iOS®, or Linux Mobile®.

In various implementations, the mobile device 102 may include, but is not limited to, one or more processor(s) 104 having any number of processing cores, an ID module 108, such as a SIM card, an input/output component 110 for receiving and outputting user and/or auxiliary device data, a network interface 112 for communicating with a serving telecommunication service provider, and a memory 106 storing at least a device operating system (OS) 114, one or more software applications 116, and a Secure Lock component 118. In an exemplary implementation, the Secure Lock component 118 can include a secure-on-chip (SoC) boot loader 120, as well as any number of boot signatures and/or cryptographic security identifiers 122.

Although not explicitly depicted in FIG. 1, each of the one or more processor(s) 104 of the mobile device 102 can include a central processing unit (CPU) having any number of arithmetic logic units (ALUs), configured to perform arithmetic and logical operations, as well as, one or more control units (CUs) configured to extract instructions and other content from processor-level cache memory, and then execute the instructions by calling on the ALUs, as necessary, during program execution. In various embodiments, the processor(s) 104 may be configured to execute the Secure Lock component's 118 boot loader 120, the device OS 114, as well as, the computer applications 116 stored in the device's 102 memory 106. In various embodiments, the memory 106 may be associated with any common type of volatile (RAM) and/or non-volatile (ROM) memory.

In an implementation, the SoC boot loader 120 can be invoked when the mobile device 102 is initially powered ON, restarted, and/or reset. Further, the SoC boot loader 120 may be associated with either a signed boot loader that employs layer-by-layer boot signature authentication, or with an unsecure boot loader that does not require any boot layer signing procedures during a corresponding boot sequence. In an embodiment, the security identifiers/keys 122 of the Secure Lock component 118 may be associated with any known type of cryptographic security implement, including, but not limited to: a symmetric cryptographic key, an asymmetric cryptographic public/private key, and a cryptographic hash key.

It should be understood that the term "Secure Lock," as used herein, refers to a specialized substantially software-based security utility/mechanism that employs one or more cryptographic security technologies to ensure only authorized access is granted to various software and/or hardware resources of a mobile communication device. In various implementations, the Secure Lock component 118 may operate as and/or be utilized to embody both a device software security mechanism and a device hardware security mechanism.

Figure 2:
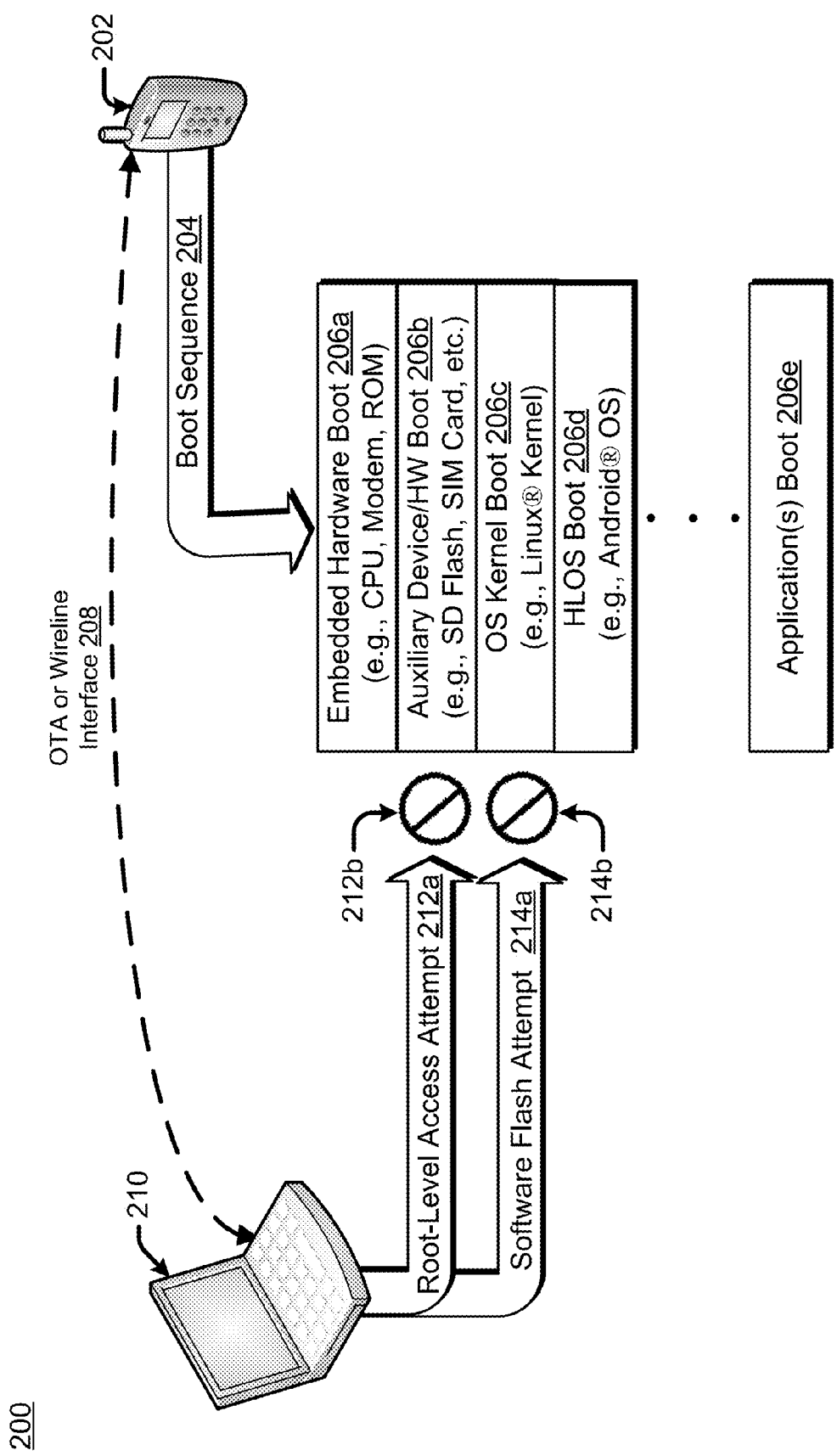
FIG. 2 depicts a network diagram of a security-enabled device boot sequence, where unauthorized device access attempts are prevented, in accordance with various implementations of the disclosure.

FIG. 2 illustrates a network-computing environment 200 including a laptop computer 210 that is in communications with a telecommunication device 202 (e.g., the mobile device 102 of FIG. 1) during a security-enabled boot sequence 204. The security-enabled boot sequence 204 of the telecommunication device 202 may be initiated and/or controlled by the Secure Lock 118 SoC boot loader 120 (depicted in FIG. 1). In an embodiment, the boot loader 120 initiates a security-enabled boot sequence that begins at a first boot layer 206a, after the telecommunication device 202 is powered ON, restarted, or reset, such as during a runtime event. At the first boot layer 206a the SoC boot loader 120 may initialize the embedded hardware (e.g., the CPU, Modem, ROM, RAM, etc.) of the telecommunication device 202. Next, at the second boot layer 206b, the SoC boot loader 120 may initialize various auxiliary device(s) and/or non-embedded hardware (e.g., SD Flash memory, a SIM Card, an external power supply, etc.). Thereafter, at the third boot layer 206c the SoC boot loader 120 can boot the telecommunication device's 202 OS Kernel 206c (e.g., the Linux® Kernel) to facilitate subsequent control of device resources by the telecommunication device's 202 high-level OS (HLOS).

Further, at the fourth boot layer 206d, the SoC boot loader 120 may initialize the telecommunication device's 202 HLOS 206d (e.g., the Google® Android® OS). Subsequently, the SoC boot loader 120 can sequentially boot various other device-specific boot layers (not shown), until reaching a final boot layer 206e of the boot sequence's 204 boot stack, where one or more software applications can be initialized. During the boot sequence procedure 204, the telecommunication device 202 may detect one or more unauthorized access attempts, such as a root-level access attempt 212a or a software flash attempt 214a. In an embodiment, a user of the laptop computer 210 can communicate with the telecommunication device 202 during the boot sequence 204 using any common over-the-air (OTA) interface or a wireline interface 208, such as a USB cable.

In accordance with various implementations, described further herein, either the root-level access attempt 212a or the software flash attempt 214a can occur during at any particular boot layer 206a-e of a boot sequence 204. For example, the root-level access attempt 212a may be detected by the Secure Lock component 118 of the telecommunication device 202 at the auxiliary device boot layer 206b of the boot sequence 204, whereas the software flash attempt 214a may be detected at the OS Kernel boot layer 206c of the boot sequence 204. In either access attempt scenario, the Secure Lock component 118 may be configured to determine whether the corresponding device access attempt, 212a or 214a, is associated with an authorized access attempt or an unauthorized access attempt. In a scenario where a flash tool attempts to flash software to the telecommunication device 202, the device may be configured to authenticate the flash tool, and the flash tool may be configured to authenticate the device 202, thus providing bi-directional authentication.

In various embodiments, the Secure Lock component 118 may be configured to safeguard access to the telecommunication device's 202 International Mobile Equipment Identifier (IMEI), via cryptographic authentication. In this manner, the IMEI can be securely stored in a tamper-proof area of the device's memory, which may be associated with hardware and/or software. Further, in some implementations the telecommunication device's IMEI may be stored in a dedicated security-enabled file that is validated during a boot sequence 204 process. In a scenario where the IMEI is stored in dedicated hardware, the memory space for the IMEI may be associated with a one-time, factory-programmable (ROM) memory.

In an embodiment, the Secure Lock component 118 may be configured to require that a cryptographic identifier or key 122 be included within, or be presented in conjunction with, a corresponding access attempt, in order to authenticate access to one or more software and/or hardware resources of the telecommunication device 202. In various implementations, the cryptographic identifier may be associated with a symmetric cryptographic key, an asymmetric cryptographic public/private key, a cryptographic hash key, or the like. In some scenarios the cryptographic authentication technology employed by the Secure Lock component 118 may be boot layer specific, whereas in other scenarios, the cryptographic authentication technology employed by the Secure Lock component 118 can be independent from a particular boot sequence process. Further, in various implementations, the Secure Lock component's cryptographic authentication technology may be separate and distinct from a signature-based authentication technology employed during a layer-by-layer signed boot sequence procedure, such as Qualcomm's® SecureBoot technology.

In certain scenarios, an unauthorized root-level access attempt 212a may be denied access 212b to one or more device software and/or hardware resources, such as in a scenario where the Secure Lock component 118 determines that the access attempt does not include a required cryptographic identifier. In other scenarios, an unauthorized root-level access attempt 212a may be denied access 212b to one or more device software and/or hardware resources, such as in a scenario where the Secure Lock component 118 determines that the access attempt includes a cryptographic identifier that does not match a corresponding cryptographic identifier 122 stored in the memory 106 of the telecommunication device.

In any of these scenarios, the access attempt 212b is deemed to be an unauthorized access attempt. However, in a scenario where the Secure Lock component 118 determines that a cryptographic identifier included in a root-level access attempt 212a matches a corresponding cryptographic identifier stored in the memory 106 of the telecommunication device 202, root-level access to one or more device software and/or hardware resources may be allowed.

Similarly, in some scenarios, an unauthorized software flash attempt 214a may be blocked 214b from accessing one or more device software and/or hardware resources, such as in a scenario where the Secure Lock component 118 determines that the flash access attempt does not include a required cryptographic key. In other scenarios, an unauthorized software flash attempt 214a may be denied access 214b to one or more device software and/or hardware resources in a scenario where the Secure Lock component 118 determines that the flash attempt 214a includes a cryptographic key that does not match a corresponding cryptographic key 122 stored in the memory 106 of the telecommunication device 202. Alternatively, in a scenario where the Secure Lock component 118 determines that a cryptographic key included in a software flash attempt 214a matches a corresponding cryptographic identifier stored in the memory 106 of the telecommunication device 202, access to one or more device software and/or hardware resources may be granted.

Figure 3:
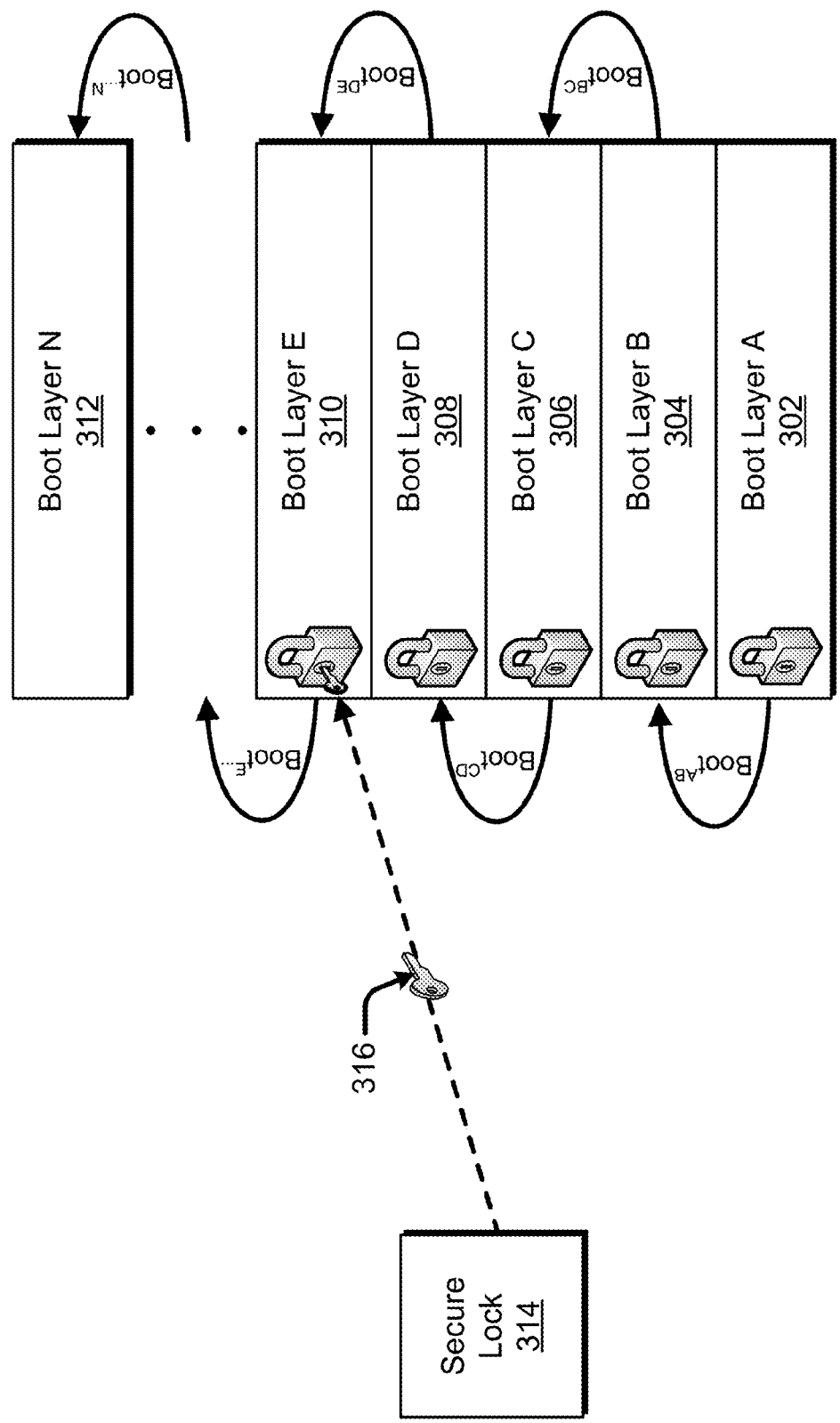
FIG. 3 depicts a security-enabled boot sequence, where a cryptographic key is employed to authenticate access to a mobile device during a particular boot sequence process, in accordance with embodiments of the disclosure.

FIG. 3 depicts a security-enabled boot sequence 300 that includes numerous, distinct boot layers within a typical boot stack arrangement. In an embodiment, the boot stack can include any number of boot layers A through N, 302, 304, 306, 308, 310, and 312, which are sequentially booted in a layer-by-layer manner, such as from the bottom layer, boot layer A 302, up through the top layer, boot layer N 312. By way of example, during a first operation of a corresponding device boot sequence, boot layer A 302 may be initialized by a device boot loader. During a subsequent boot operation of the boot sequence, boot layer B 304 may be initialized by the boot loader . . . and so on, until the top-most boot layer, boot layer N 312 is initialized by the boot loader during a final boot operation, thereby completing the boot sequence. In various implementations, the Secure Lock component 314 can employ a cryptographic security technology that prevents unauthorized access to one or more device resources at each layer in the boot sequence, 302, 304, 306, 308, 310, and 312 (represented as locks in FIG. 3).

In an embodiment, the Secure Lock component 314 may authenticate access to the one or more device resources at a particular layer in the boot stack, such as at boot layer E 310. Boot layer E 310 can be representative of a boot process associated with an initialization of an OS kernel 206c or an initialization of a HLOS 206d. For example, upon determining a cryptographic identifier included in an access attempt to be valid, the Secure Lock component 314 can issue an unlock command 316 to the device at the corresponding boot layer 310, and allow access to one or more device software and/or hardware resources, in response to the access attempt being authenticated. As discussed above, this cryptographic security measure can be employed in conjunction with a signed boot sequence or in conjunction with an otherwise unsecure boot sequence. In other embodiments, this cryptographic security measure can be employed during one or more device runtime activities or events, which might occur after the device has been partially or fully booted.

Figure 4:
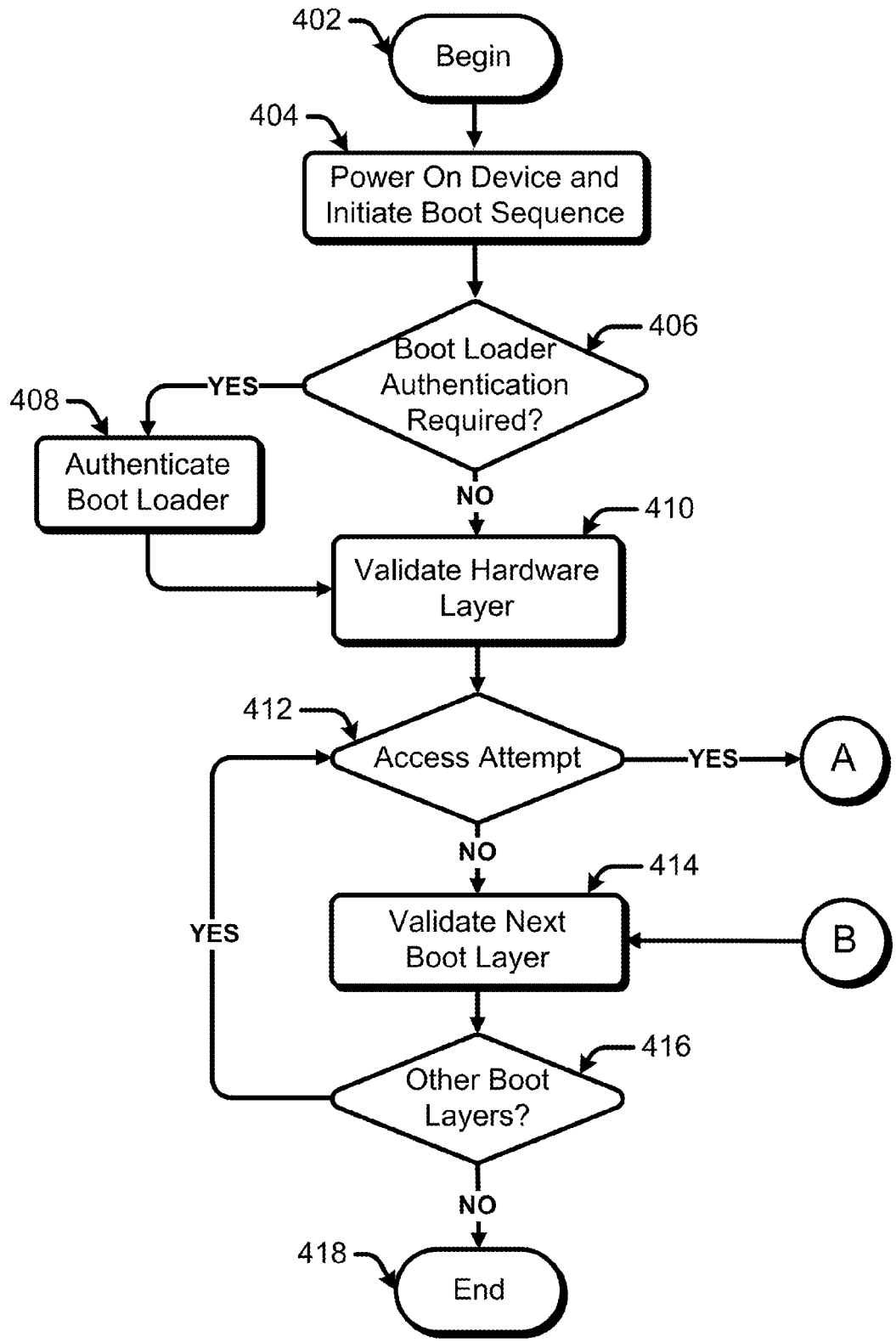
FIG. 4 depicts a flow diagram showing a first portion of a security-enabled boot sequence, in accordance with various implementations of the disclosure.

FIG. 4 depicts a first portion of a flow diagram 400 that is associated with a security-enabled boot sequence, in accordance with various implementations of the disclosure. The procedure begins at block 402, which may occur in response to either a user-initiated action or a device-initiated action, such as a device restart or a power ON event. At block 404, a mobile device 102 may be powered ON and a corresponding device-specific boot sequence may be initiated. Next, at decision block 406, it is determined as to whether the device's 102 boot loader 120 requires its own authentication. In a scenario where the device boot loader 120 does require authentication, the corresponding boot loader 120 can be authenticated as block 408. Alternatively, in a scenario where the device boot loader 120 does NOT require authentication, the flow proceeds to block 410, where the hardware layer of the boot stack is validated or signed (e.g., via a signed boot sequence authentication process).

Next, at decision block 412, a determination may be made as to whether a device access attempt has been detected (e.g., by the Secure Lock component 118). In a scenario where a device access attempt has been detected, the flow proceeds to decision block 502 of FIG. 5, via path "A." However, in a scenario where a device access attempt has NOT been detected, the flow proceeds to block 414, where the next boot layer is validated. Thereafter, at decision block 416, it is determined as to whether other boot layers exist in the boot stack of the corresponding boot sequence. In a scenario where not all boot layers have been initialized, or booted, the flow returns to decision block 412, until each successive boot layer of the boot stack is validated or signed. Then, at block 418, the process ends.

Figure 5:
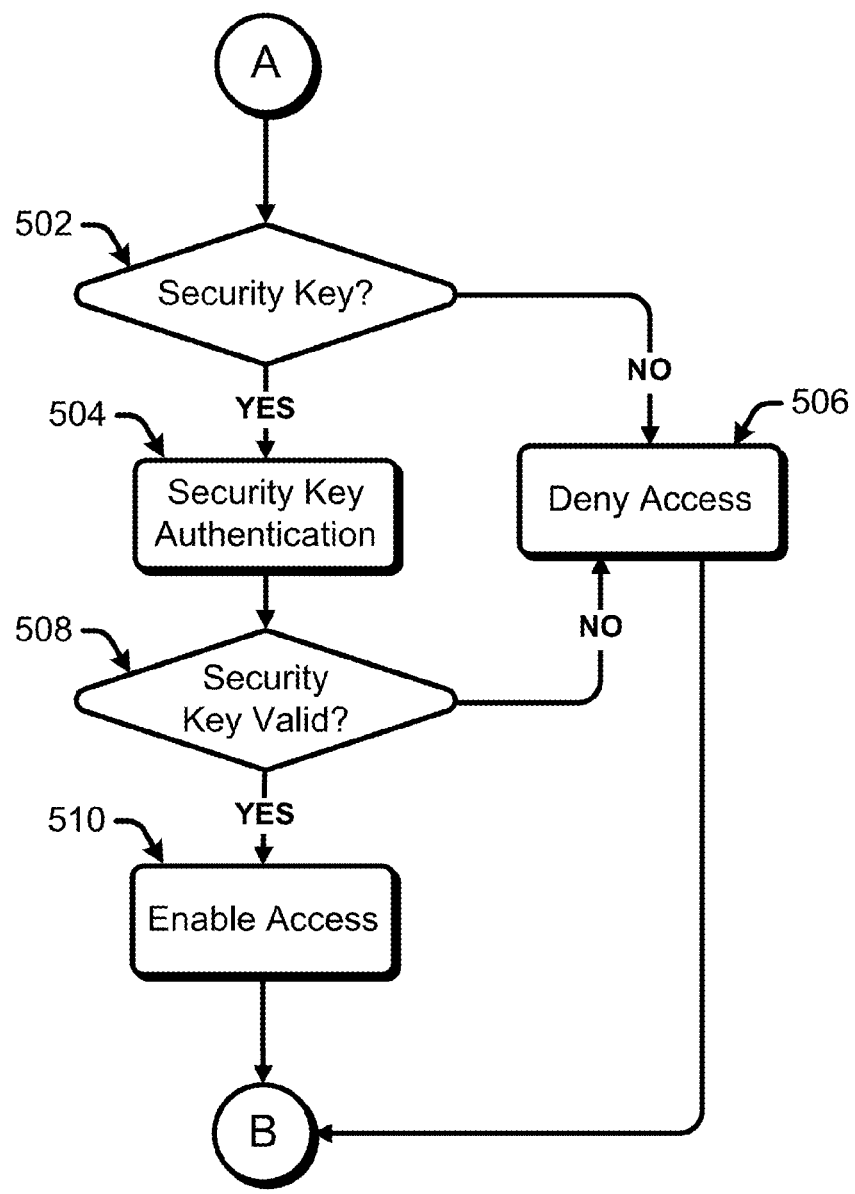
FIG. 5 depicts a flow diagram showing a second portion of the security-enabled boot sequence of FIG. 4, including cryptographic authentication, in accordance with embodiments of the disclosure.

FIG. 5 depicts a second portion 500 of the flow diagram 400 of FIG. 4, employing cryptographic authentication during a security-enabled boot sequence. The authentication procedure, which emanates from path "A," begins at decision block 502, where a determination is made as to whether a cryptographic security key (e.g., a symmetric cryptographic key, an asymmetric cryptographic public/private key, and a cryptographic hash key) is included in a corresponding device access attempt (this is indicated by a YES at decision block 412). In a scenario where a cryptographic key is determined NOT to be included in the device access attempt, access to one or more device software and/or hardware resources is denied at block 506. Thereafter, the process returns to block 414 of FIG. 4, via path "B."

Alternatively, in a scenario where a cryptographic security key is determined to be included in the device access attempt, the flow proceeds to block 504, where a security key authentication process is initialized. Subsequently, the flow proceeds to decision block 508, where a determination is made as to whether the cryptographic security key included in the access attempt is valid, in compliance with the cryptographic security technology employed. In a scenario where the cryptographic security key is determined to be valid, access to the one or more device resources is enabled at block 510, and the flow returns to block 414 via path "B." Alternatively, in a scenario where the cryptographic security key is determined NOT to be valid, access to the one or more device resources is denied at block 506. Subsequently, the flow returns to block 414 via path "B."

Figure 6:
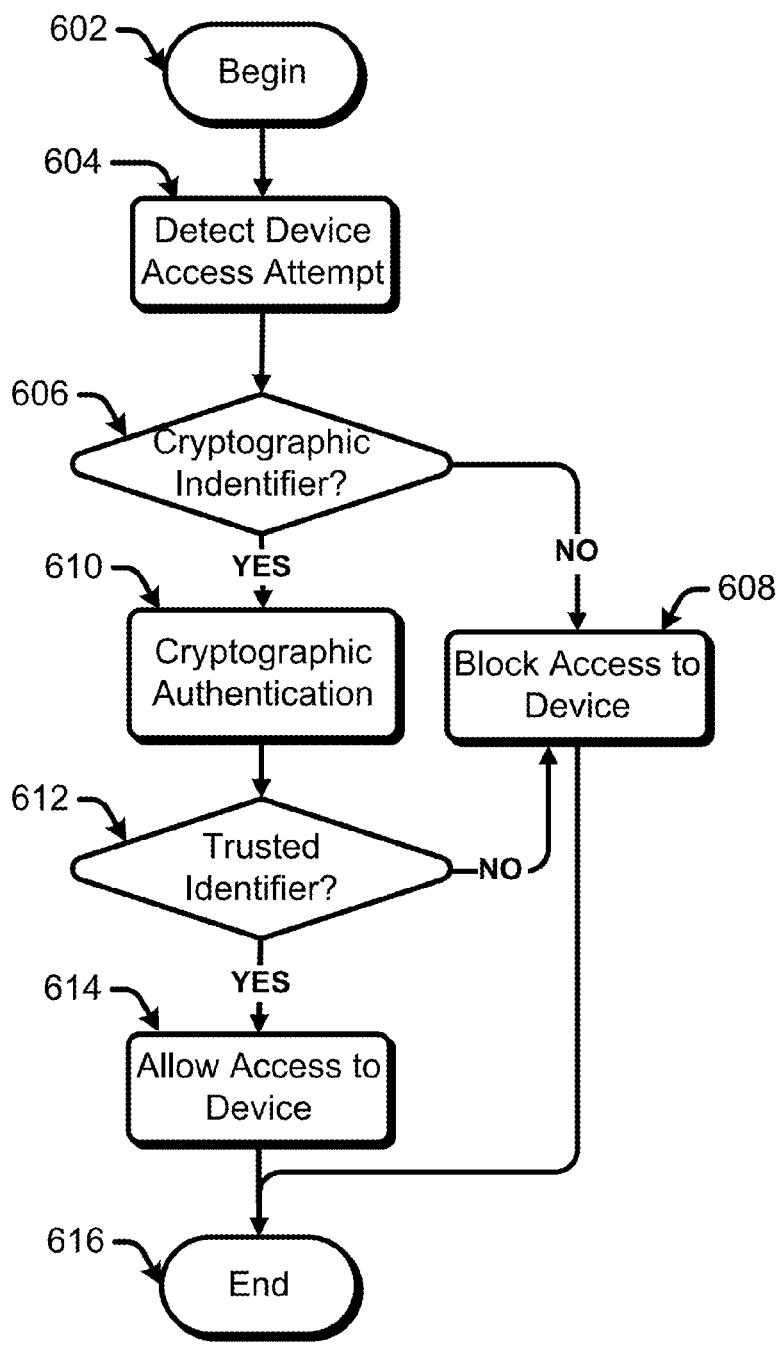
FIG. 6 depicts a flow diagram showing a device access procedure, where a cryptographic identifier is utilized to access one or more device resources, in accordance with various implementations of the disclosure.

FIG. 6 depicts a flow diagram that is associated with a device access procedure 600, where a cryptographic identifier is utilized to access one or more device resources, in accordance with an embodiment of the disclosure. The procedure begins at block 602, such as during a runtime activity (occurring after the device is fully booted), and proceeds to block 604 where a device access attempt is detected. Then, decision block 606, a determination is made as to whether a cryptographic identifier (e.g., a symmetric cryptographic key, an asymmetric cryptographic public/private key, and a cryptographic hash key) is included in a corresponding device access attempt. In a scenario where a cryptographic identifier is determined NOT to be included in the device access attempt, access to one or more device software and/or hardware resources is denied at block 608. Thereafter, the process ends at block 616.

Alternatively, in a scenario where a cryptographic identifier is determined to be included in the device access attempt, the flow proceeds to block 610, where a cryptographic identifier authentication process is initialized. Subsequently, the flow proceeds to decision block 612, where a determination is made as to whether the cryptographic identifier included in the access attempt is a trusted cryptographic identifier. In a scenario where the cryptographic identifier is determined to be trusted, access to the one or more device resources is allowed at block 614. The flow process then ends at block 616. Alternatively, in a scenario where the cryptographic identifier is determined NOT to be a trusted cryptographic identifier, access to the one or more device resources is prohibited at block 608. Subsequently, the flow process ends at block 616.

Figure 7:
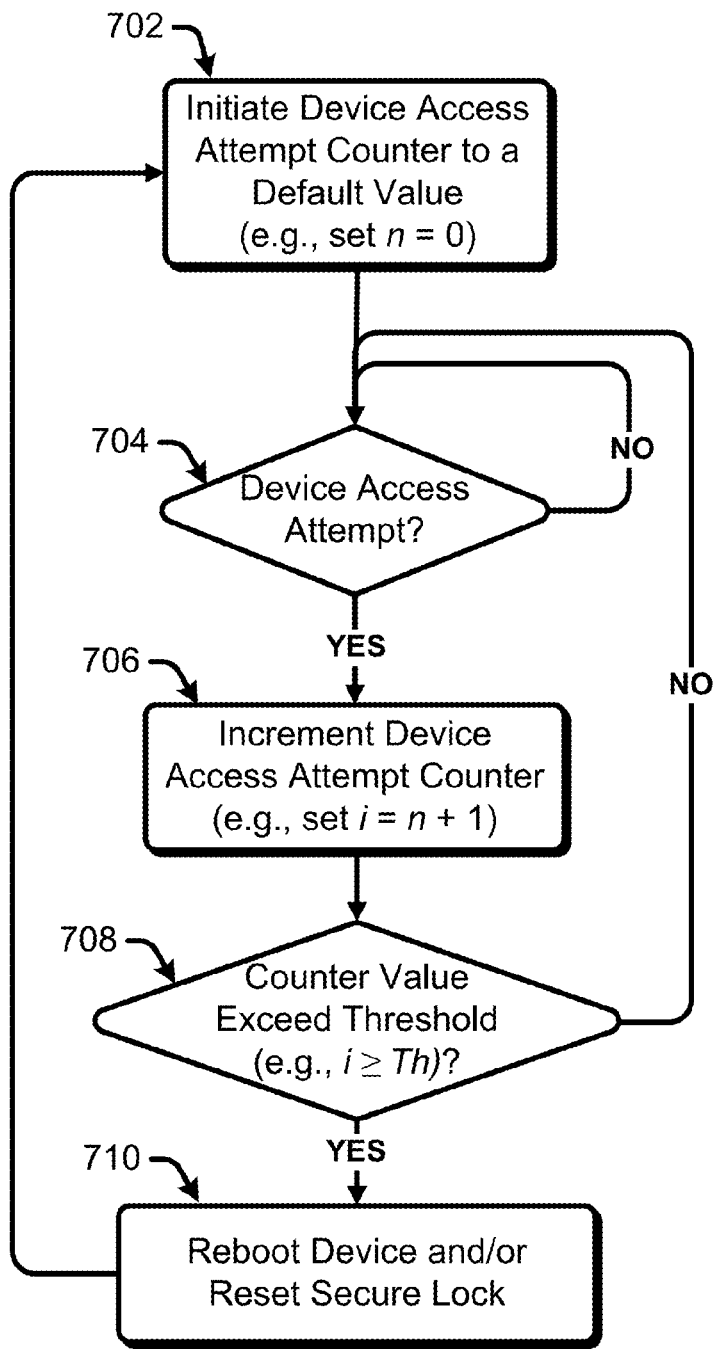
FIG. 7 depicts a flow diagram showing a device security procedure, where an access attempt counter is utilized to selectively reboot/reset a device's security mechanism(s), in accordance with embodiments of the disclosure.

FIG. 7 depicts a flow diagram showing a device security procedure 700, where an access attempt counter is utilized to selectively reboot a device, or otherwise reset the device's security mechanism(s), in accordance with various embodiments of the disclosure. It should be understood that the Secure Lock component 118 stored in the memory 106 of the mobile device 102 may include a device access attempt counter (not shown), as described in association with the device security procedure 700 of FIG. 7. Alternatively, in accordance with other implementations, the device access attempt counter may be stored in the device memory 106, independent from the Secure Lock component 118.

The device security procedure 700 begins at block 702, where a device access attempt counter is initialized to a default value (e.g., setting counter value "n"=0). Then at decision block 704, a determination is made as to whether a device access attempt has been detected. In a scenario where a device access attempt has NOT been detected, the process loops back to decision block 704, where the procedure awaits a qualified access attempt. Alternatively, in a scenario where a device access attempt has been detected, the flow proceeds to block 706, where the device access attempt counter is incremented by one (e.g., setting incremented counter value "i"=n+1), to indicate that one new access attempt has been detected.

Then the flow proceeds to decision block 708, where the incremented counter value is compared to a corresponding access attempt counter threshold value, to determine whether the incremented counter value equals or exceeds the threshold value (e.g., is the counter value "i" greater than or equal to the threshold value "Th?"). In a scenario where the counter value is determined NOT to be greater than or equal to the access attempt counter threshold value, the process loops back to decision block 704, and awaits further device access attempt detection. Alternatively, in a scenario where the counter value is determined to be greater than or equal to the access attempt counter threshold value, the flow proceeds to block 710, where the device is rebooted and/or the device's 102 Secure Lock component 118 is reset. Subsequently, the flow returns to block 702 where the access attempt counter is reinitialized to the default value (e.g., by again setting n=0).

Figure 8:
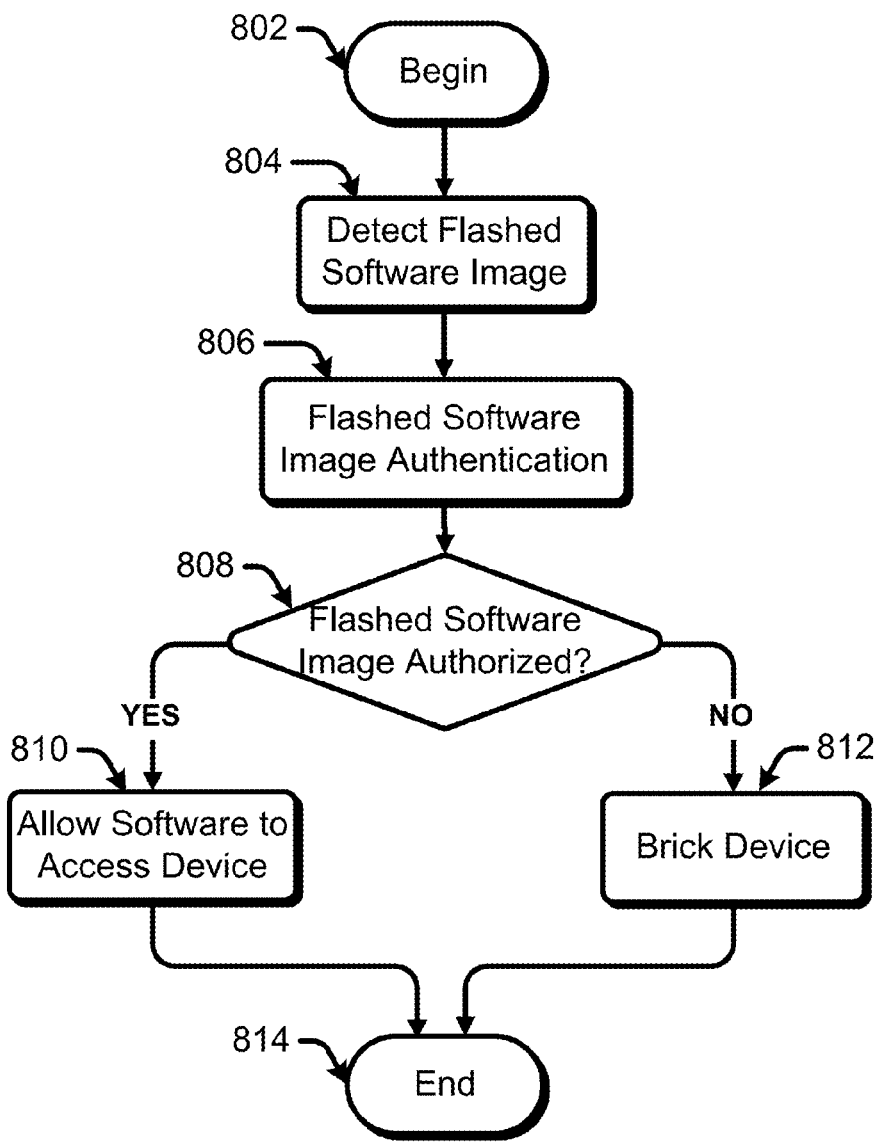
FIG. 8 depicts a flow diagram showing a procedure for detecting an unauthorized software image at a device, in accordance with various implementations of the disclosure.

FIG. 8 depicts a flow diagram showing a procedure for detecting an unauthorized software image 800 at a mobile device 102, in accordance with various implementations of the disclosure. The process begins at block 802, either during a software flash event, or in response flashed software detection event. Initially, at block 804, a flashed software image is detected (e.g., at a telecommunication device). Then, the flow proceeds to block 806, where the detected, flashed software image is analyzed for authentication. Next, at decision block 808, a determination is made as to whether the corresponding flashed software image is a software image that is authorized, such as by a corresponding device manufacturer and/or a telecommunication service provider.

In a scenario where the corresponding flashed software image is determined to be authorized, the flow proceeds to block 810, where the flashed software is allowed access to one or more device software and/or hardware resources. Then the procedure ends at block 814. Alternatively, in a scenario where the corresponding flashed software image is determined NOT to be authorized (e.g., an unauthorized software image), the flow proceeds to block 812, where the device is "bricked." The term "bricked" is associated with a semi-permanent lock state that can only be removed by a corresponding service provider entity. Accordingly, when a device has been "bricked," a user is generally no longer able to use the corresponding device. Thereafter, the procedure ends at block 814. It should be appreciated that in response an unauthorized flashed image being detected at a telecommunication device, the device may be rendered unusable, until a time when a service provider agrees to reprovision the bricked device.

Figure 9:
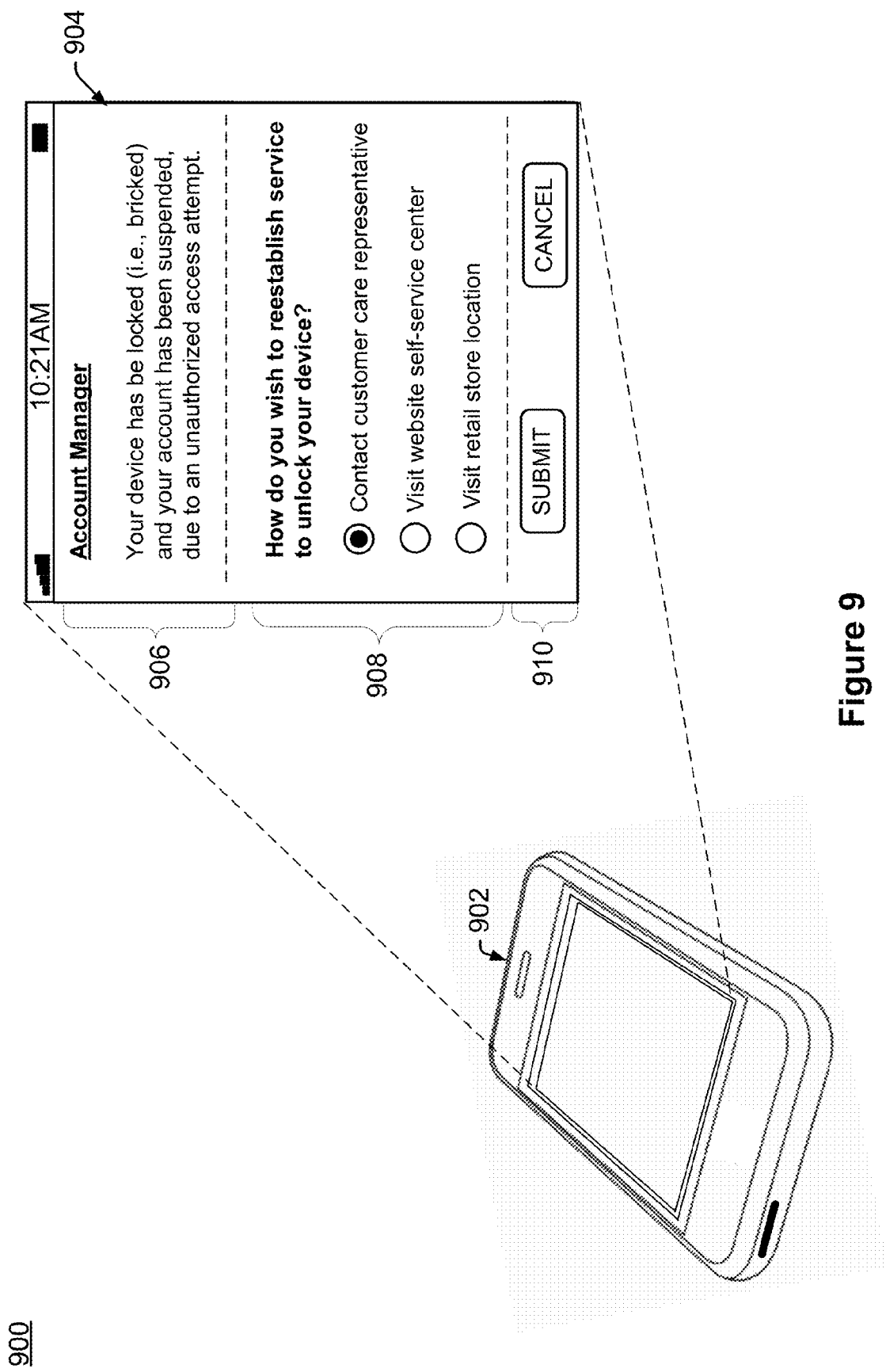
FIG. 9 depicts a telecommunication device user interface indicating a bricked access status, in accordance with various implementations of the disclosure.

FIG. 9 depicts a telecommunication device 902 user interface 904 indicating a bricked access status 900, in accordance with various implementations of the disclosure. In some embodiments, when a telecommunication device 902 experiences an unauthorized access attempt, such as a flash attempt of unapproved software, the device 902 may be automatically bricked 812, and a corresponding notification may be generated and presented to the user via the device display 904. In certain scenarios, this notification 904 may include an account manager messaging area 906, which may indicate the status of the bricked device, by displaying an applicable text message, such as a message stating "Your device has been locked and your account has been suspended due to an unauthorized access attempt."

Additionally, the notification 904 may include an area 908 providing one or more selectable options for curing the locked and/or bricked status of the device 902. In some situations these options 908 may include, but is not limited to, an option to contact a customer care representative (e.g., by telephone), an option to visit a corresponding telecommunication service provider website, and an option to visit a retail store location associated with the telecommunication service provider. In some implementations, when an option has been selected at the options selection area 908 an affected telecommunication device user may select to "Submit" their selection to the service provider via a command selection area 910 of the interface 904. Alternatively, the user can select to end the interface notification 904 by selecting the "Cancel" option from the command selection area 910.

In other embodiments, the user may be prompted (via a corresponding notification interface) to enter an unlock code after their telecommunication device 902 has been locked and/or bricked. In some situations, when various unlock code access attempt(s) have repeatedly failed (e.g., have been unsuccessful a predetermined number of times) the user's device may reboot to ensure that automated (brute-force) tools are not being employed. These automated tools may correspond to iterative sequenced guessing tools that may be able to guess the right unlock code after an extended period of time, after continually guessing numerous, incorrect access codes.

With reference to the above discussion, it should be understood that, although several examples and related implementations and/or embodiments are described herein, the subject matter discussed is not intended to be all-inclusive, nor exhaustive in its description(s). As such, it should be understood that the subject matter described in this disclosure can be reasonably modified, rearranged, or otherwise altered, to achieve similar results, without departing from the spirit and scope of the claimed invention. Further, it should also be understood that new or updated telecommunication technologies might be implemented or standardized subsequent to time of this disclosure. Accordingly, the concepts discussed herein should be construed to apply to similar, future telecommunications technologies, as the field of wireless telecommunications is constantly evolving.

What is claimed is:

1. A telecommunication device comprising:
   one or more processors;
   an access attempt counter; and
   a memory coupled to the one or more processors, and having at least a secure lock component and a device operating system (OS),
   wherein the secure lock component is operable by the one or more processors to:
      initialize the access attempt counter to a default value n;
      detect a device access attempt during a boot sequence of the telecommunication device, wherein each of multiple layers in a boot stack of the boot sequence employs a cryptographic lock that is configured to be unlocked with a first security key;
      initiate a cryptographic validation operation when a second security key is encountered as a part of the device access attempt;
      in response to utilizing the first security key to determine that the second security key is valid during the cryptographic validation operation, enable access to at least one resource of the telecommunication device; and
      in response to utilizing the first security key to determine that the second security key is not valid during the cryptographic validation operation,
         deny access to the at least one resource of the telecommunication device;
         increment the access attempt counter value n to a value i, where i=n+1;
         compare the incremented access attempt counter value i to an access attempt threshold value Th;
         determine whether a counter equation i≥Th is satisfied based at least in part on the comparison; and
         reboot the telecommunication device in response to determining that the incremented access attempt counter value i satisfies the counter equation.

2. The telecommunication device of claim 1, wherein the secure lock component comprises a secure on chip (SoC) boot loader that is configured to control the boot sequence, and wherein the boot sequence includes at least one boot layer that is bootable by the SoC bootloader to initialize the device OS.

3. The telecommunication device of claim 1, wherein the secure lock component is further operable by the one or more processors to reset the access attempt counter to the default value n, in response to determining that the incremented access attempt counter value i satisfies the counter equation.

4. The telecommunication device of claim 1, wherein the secure lock component is further operable by the one or more processors to detect a plurality of unauthorized user access attempts at the telecommunication device, and wherein at least one of the plurality of unauthorized user access attempts is associated with an invalid unlock code that is received at an interface of the telecommunication device.

5. The telecommunication device of claim 1, wherein the secure lock component is further operable by the one or more processors to:
   detect an unauthorized software image in, or being flashed to, the memory of the telecommunication device; and brick access to the telecommunication device in response to detecting the unauthorized software image.

6. A method comprising:
initializing, by a telecommunication device, a device access attempt counter to a default value n;
detecting a device access attempt during a boot sequence of the telecommunication device, wherein each of multiple layers in a boot stack of the boot sequence employs a cryptographic lock that is configured to be unlocked with a first security key;
initiating a cryptographic validation operation when a second security key is encountered as a part of the device access attempt; and
in response to utilizing the first security key to determine that the second security key is valid during the cryptographic validation operation, enabling access to at least one resource of the telecommunication device; or
in response to utilizing the first security key to determine that the second security key is not valid during the cryptographic validation operation,
denying access to the at least one resource of the telecommunication device;
incrementing the device access attempt counter value n to a value i, where i=n+1;
comparing the incremented device access attempt counter value i to an access attempt threshold value Th;
determining whether a counter equation i≥Th is satisfied based at least in part on the comparison; and
rebooting the telecommunication device in response to determining that the incremented device access attempt counter value i satisfies the counter equation.

7. The method of claim 6, further comprising detecting a plurality of unauthorized access attempts at the telecommunication device, wherein at least one of the plurality of unauthorized access attempts is associated with receiving an invalid unlock code at an interface of the telecommunication device.

8. The method of claim 6, further comprising resetting the device access attempt counter to the default value n, in response to determining that the incremented device access attempt counter value i satisfies the counter equation.

9. The method of claim 6, further comprising generating a notification indicating a bricked or a locked status of the telecommunication device, wherein the notification includes an option for curing the bricked or locked status of the telecommunication device.

10. The telecommunication device of claim 1, wherein the secure lock component is further operable by the one or more processors to generate a notification indicating a bricked or a locked status of the telecommunication device, wherein the notification includes an option for curing the bricked or locked status of the telecommunication device.

11. The method of claim 6, further comprising:
detect an unauthorized software image in, or being flashed to, memory of the telecommunication device; and
brick access to the telecommunication device in response to detecting the unauthorized software image.

12. A non-transitory computer storage device with a stored computer-executable program, which, when executed by one or more processors of a telecommunication device, performs operations comprising:
initializing a device access attempt counter to a default value n;
detecting a device access attempt during a boot sequence of the telecommunication device, wherein each of multiple layers in a boot stack of the boot sequence employs a cryptographic lock that is configured to be unlocked with a first security key;
initiating a cryptographic validation operation when a second security key is encountered as a part of the device access attempt;
in response to utilizing the first security key to determine that the second security key is valid during the cryptographic validation operation, enabling access to at least one resource of the telecommunication device; and
in response to utilizing the first security key to determine that the second security key is not valid during the cryptographic validation operation,
denying access to the at least one resource of the telecommunication device;
incrementing the device access attempt counter value n to a value i, where i=n+1;
comparing the incremented device access attempt counter value i to an access attempt threshold value Th;
determining whether a counter equation i≥Th is satisfied based at least in part on the comparison; and
rebooting the telecommunication device in response to determining that the incremented device access attempt counter value i satisfies the counter equation.

13. The non-transitory computer storage device of claim 12, wherein the operations further comprise detecting a plurality of unauthorized access attempts at the telecommunication device, wherein at least one of the plurality of unauthorized access attempts is associated with receiving an invalid unlock code at an interface of the telecommunication device.

14. The non-transitory computer storage device of claim 12, wherein the operations further comprise resetting the device access attempt counter to the default value n, in response to determining that the incremented device access attempt counter value i satisfies the counter equation.

15. The non-transitory computer storage device of claim 12, wherein the operations further comprise generating a notification indicating a bricked or a locked status of the telecommunication device, wherein the notification includes an option for curing the bricked or locked status of the telecommunication device.

16. The non-transitory computer storage device of claim 12, wherein the operations further comprise:
detect an unauthorized software image in, or being flashed to, memory of the telecommunication device; and
brick access to the telecommunication device in response to detecting the unauthorized software image.

* * * * *